Nov. 4, 1952 — W. THOMAS — 2,616,509
PNEUMATIC AIRFOIL

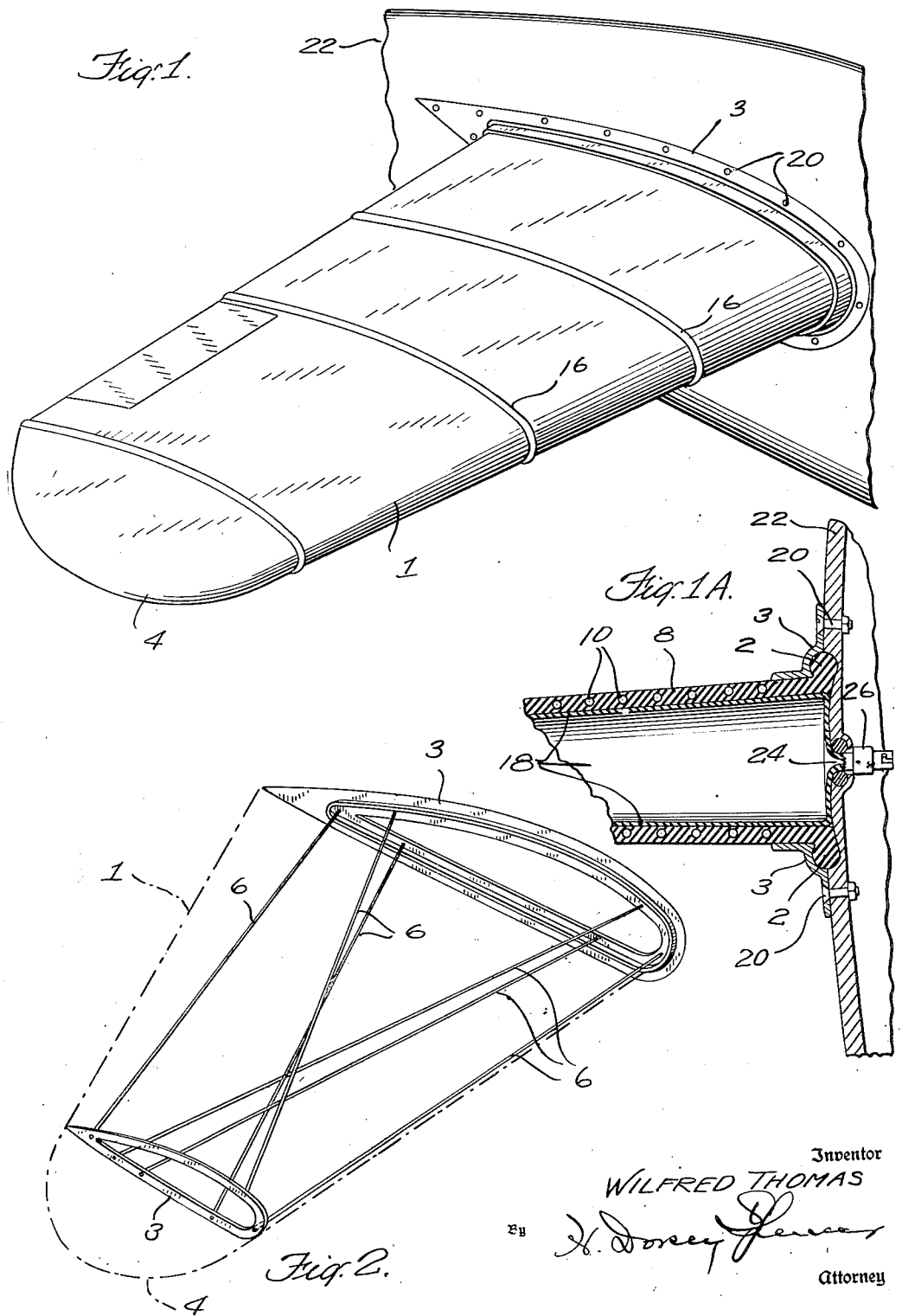

Filed Nov. 29, 1946 — 5 Sheets-Sheet 2

Inventor
WILFRED THOMAS
By H. Dorsey Spencer
Attorney

Nov. 4, 1952 W. THOMAS 2,616,509
PNEUMATIC AIRFOIL
Filed Nov. 29, 1946 5 Sheets-Sheet 3
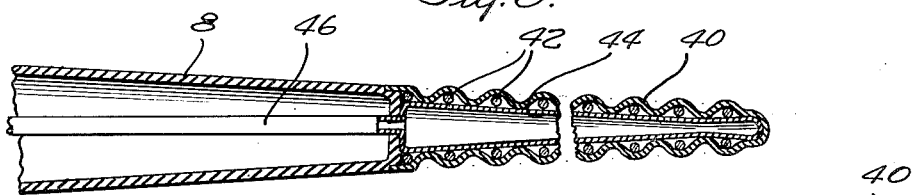
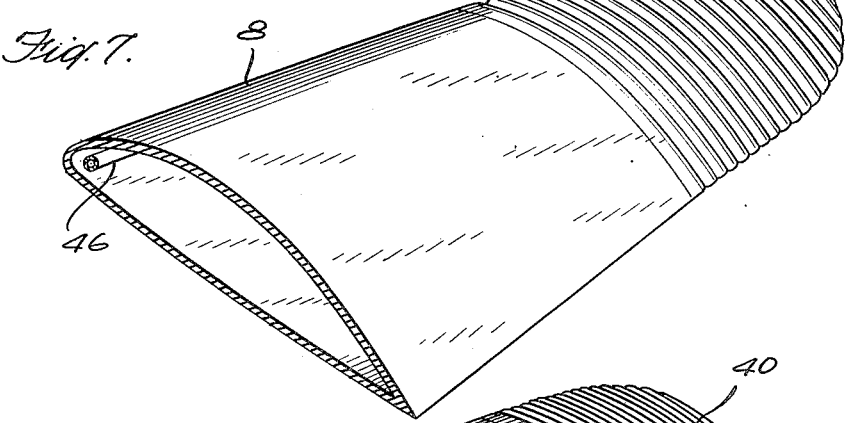
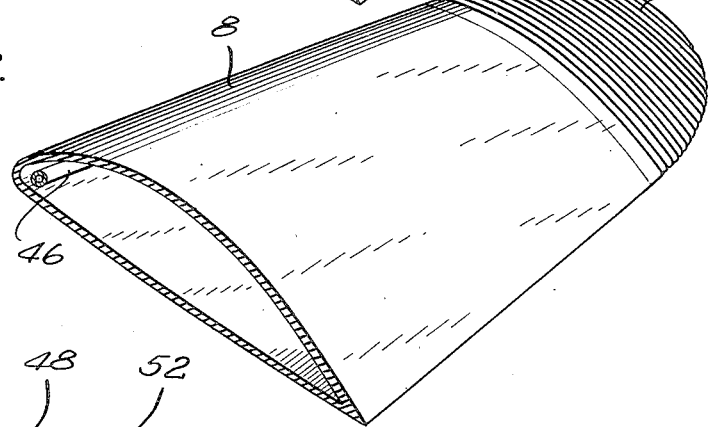
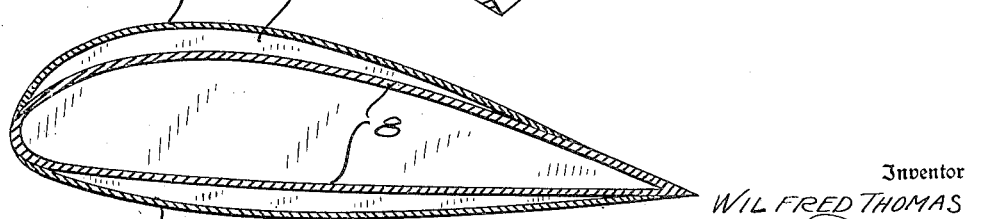
Inventor
WILFRED THOMAS
By H. Dorsey
Attorney Nov. 4, 1952  W. THOMAS  2,616,509
PNEUMATIC AIRFOIL
Filed Nov. 29, 1946  5 Sheets-Sheet 4
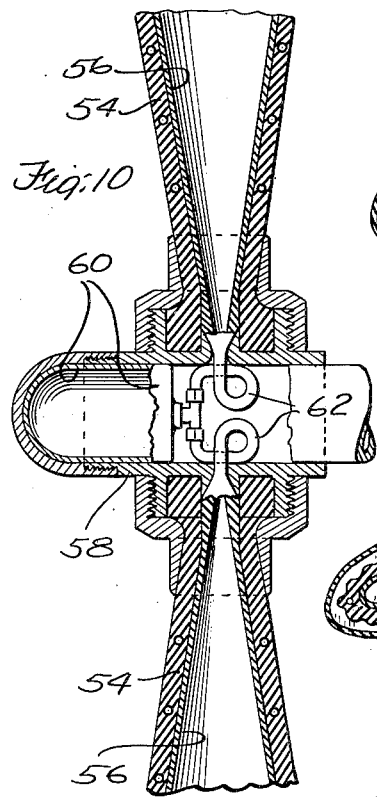
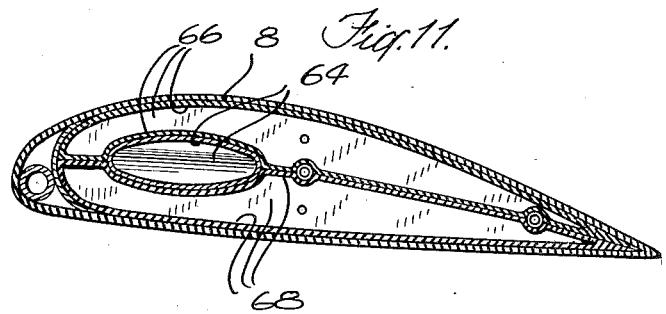
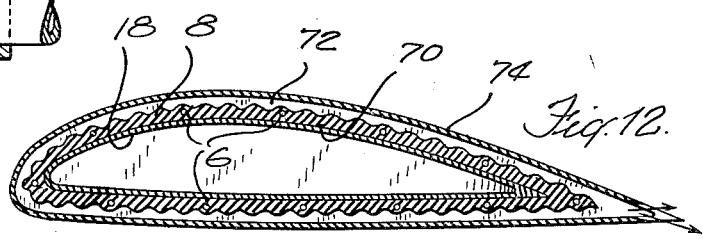
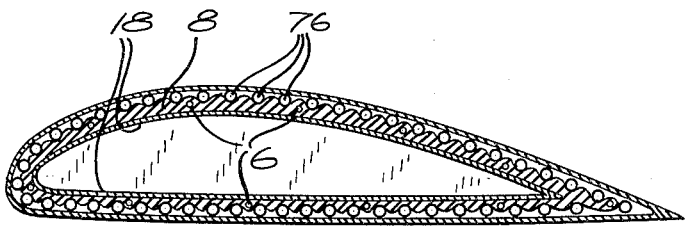
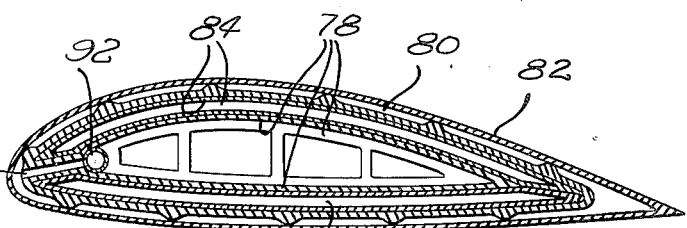
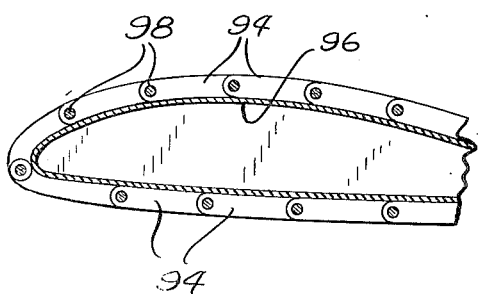
Inventor
WILFRED THOMAS
Attorney Nov. 4, 1952 — W. THOMAS — 2,616,509
PNEUMATIC AIRFOIL
Filed Nov. 29, 1946 — 5 Sheets-Sheet 5

Inventor
WILFRED THOMAS
By H. Dorsey Spencer
Attorney

Patented Nov. 4, 1952

2,616,509

UNITED STATES PATENT OFFICE 2,616,509

PNEUMATIC AIRFOIL

Wilfred Thomas, Albany, N. Y.

Application November 29, 1946, Serial No. 713,037

3 Claims. (Cl. 170—160.12)

This invention relates to the structural elements of aircraft and particularly to those aircraft elements, hereinafter referred to generally as "airfoils," which are so designed that when moved through the air they produce a useful dynamic reaction, such, for example, as the wings, stabilizers, rudders, elevators, ailerons and propellers of airplanes, the rotors of helicopter and autogyro aircraft, the airfoil structures of flying missiles, radio control bombs, etc. It will be understood also that certain features of the invention are applicable to the airfoil elements of dirigibles, blimps, etc. and also to the structural elements of gliders.

A general object of the invention is so to combine, in the structure of an airfoil, flexible surfaces with struts giving the desired two-dimensional and/or three-dimensional support that, when a pneumatic chamber or pneumatic chambers within the airfoil are subjected to internal pneumatic pressure, the airfoil will assume both its desired operative shape and the desired resistance to deformation.

Among the advantages of the use of more flexible airfoil surface materials and more flexible strut constructions, in connection with the utilization of internal pneumatic pressure to produce the desired operative shape and resistance to deformation, is the avoidance of the liability to permanent deformation when the element is subjected to shock, bending or twisting, or, in other words, the increased shock absorbing characteristics of the airfoil of the present invention and its resistance to those stresses which may cause either breakage or permanent deformation of the necessarily comparatively light airfoil constructions of the prior art.

A further important object of the invention is so to combine flexible struts with flexible surface materials and inflatable pneumatic chambers as to produce airfoils of lighter overall weight for the same structural strength.

Although the invetnion finds one of its most important fields of utility in its application to the wings and other airfoil elements of airplanes, it will be apparent that a further wide field of utility of the invention is in the design and construction of cargo landing gliders, flying missiles and the like. One of the important advantages of the invention, in its application to this field of utility, is the fact that cargo landing gliders, missiles, etc., when deflated, occupy much less storage space than would a rigid structure of similar carrying capacity.

A further important feature of the invention, particularly for aircraft flying over water, is the natural buoyancy of the structure by reason of the inflated air- and water-tight containers forming a part of the airfoil structures.

The invention is adaptable to substantially any airfoil construction without essential change in its aerodynamic design and, in fact, it makes possible the changing of the aerodynamic characteristics while in flight so that advantage may be taken of the requirements for different altitudes and different conditions of flight. For example, it makes possible so changing the airfoil shape, in the aerodynamic sense, as to permit a large attack shape for take-off or in other words a wider leading edge with a reduction of the foil, as altitude is attained and as high velocities are gained, to the knife edge characteristics which are more desirable under such conditions.

The invention further makes provision for the effect of changes in atmospheric pressure at different altitudes, with the consequent tendency of the confined gas within the air chambers to expand at higher altitudes and to contract again at lower altitudes. In some cases advantage is taken of this known characteristic to provide for an increase in the rigidity or resistance to deformation of the structures at the higher altitudes and the higher speeds at such altitudes. In all cases provision is made to avoid any danger from any change in the aerodynamic characteristics of the airfoils by reason of the expansion or contraction of their pneumatic elements.

Among the provisions for insuring the maintenance of the aerodynamic characteristics of the airfoils of the present invention at all altitudes, particularly in airplanes and other self propelled aircraft, are the utilization of safety valves, the use of reserve tanks of liquefied or compressed gases and the installation of automatic discharge of excessive gas or automatic replacement when any deficiency occurs in the gaseous contents of the pneumatic parts of the structure.

In the application of the invention to military or naval planes or other aircraft, it will be apparent that safety may be insured by utilizing some of the existing leak-sealing structural materials in the design and construction of the pneumatic chambers of the airfoils.

In the application of the invention to flying missiles, advantage may be taken of the fact that the aerodynamic shape of the airfoils is maintained by the internal pneumatic pressure in order to provide for the automatic deflation of the airfoils as they approach the target area to insure a more nearly vertical trajectory at the point at which the missile is to strike.

Although the invention is directed primarily to improving the construction of airfoils, in other words those elements of aircraft which, when moved through the air, produce useful aerodynamic reactions, it will be apparent that some of the structural characteristics of the invention may be applied to other aircraft elements, such, for example, as the fuselages of airplanes, whereby weight saving, increased insulation and other advantages may be obtained.

Among the important features of the present invention, when applied to airplanes as hereinabove suggested, is the possibility of its use to change the aerodynamic characteristics of the airplane wing in flight. In addition to the possibility of quickly and easily changing the shape of the leading edge of the wing is the possibility of quickly and easily changing the overall length of the wing thus getting more supporting surface at higher altitudes where the atmosphere is rarer.

Other objects, novel features and advantages of the present invention, to which reference has not hereinabove specifically been made, will appear hereinafter when the following description and claims are considered in connection with the accompanying drawings, in which Figure 1 is a perspective view of a wing type airfoil embodying the present invention;

Figure 1A is a sectional detail of the structure shown in Figure 1;

Figure 2 is a perspective view of the flexible frame construction of the airfoil of the present invention;

Figure 6 is a section through an airfoil embodying the present invention which has an extensible end or tip;

Figure 7 is a perspective view of the airfoil of Figure 6 with the tip in its extended condition;

Figure 8 is a view similar to Figure 7 with the tip in its retracted position;

Figure 9 is a section through a wing type airfoil embodying the present invention in which the upper and lower surfaces are shown as provided with inflatable blisters for effecting a change in the aerodynamic characteristics of the airfoil for different stages of the operation of the aircraft of which it forms a part;

Figure 10 is a fragmentary section through a pneumatic propeller embodying the present invention;

Figure 11 is a section through an airfoil embodying the present invention showing modifications of the construction illustrated in Figure 1A to adapt it for the use of two different gases, for the support of the fuel tank within the structure, etc.;

Figure 12 is a section of still another modification of the structure shown in Figure 1 to provide a simple conduit for heated or other surface conditioning gases;

Figure 13 shows a modification of the structure shown in Figure 12 in which the gases may be conducted through the passages in a continuous conduit or pipe;

Figure 14 shows the invention embodied in a wing type airfoil having typical wing struts as part of the structure;

Figure 15 shows a modification of the structure of the outer casing of an airfoil of the present invention;

As hereinabove suggested, the present invention has for its general object so constructing the airfoils of aircraft that they are less liable to injury from sudden stresses that may be imposed upon them, that they will have overall strength equal to that of present airfoil structures and that they will also compare favorably with present structures in the matter of weight. More particularly the invention aims to provide a structure in which unexpected stresses imposed upon the structure may be absorbed without either permanent deformation of the structure or even dangerous temporary deformation.

Figure 3:
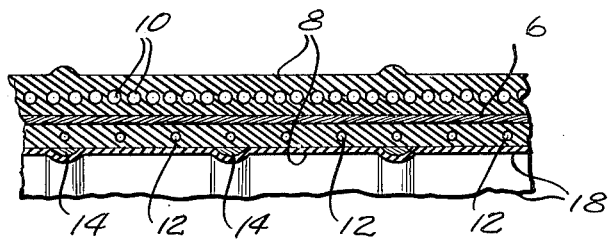
Figure 3 is a section through the casing or sheathing structure of an airfoil such as shown in Figure 1.

As shown in Figures 1 to 3 inclusive, the main elements of the frame of the airfoil are flexible, the outside sheathing or casing is also preferably flexible and the desired resistance to deformation, which makes possible the presentation of a structure having sufficient stiffness to produce the desired aerodynamic effect, is produced by means of inflatable cells within the structure which, when subjected to pneumatic pressure, press the parts of the frame structure into the desired semi-rigid shape.

In Figures 1 to 3 inclusive the airfoil is shown as provided with a clincher band 2 at one end and a tip 4 at its other end and between this band 2 and tip 4 flexible cables 6 extend, the cables being arranged as shown so that when pulled to their fully extended condition they serve as struts and, together with the casing 8, provide an airfoil that presents the required resistance to deformation necessary to produce the desired aerodynamic effect. As shown in Figure 3, the airfoil casing may comprise, in addition to the main body or casing 8, ducts 10 for the passage therethrough of an airfoil conditioning fluid, such as heated air or gas. Preferably the cables 6 are embedded within the main body or casing 8 as shown in Figure 3 and there may also be embedded in said casing other reinforcement such as wire cords 12 going about the foil in directions transverse to the cables 6. Reinforcing ribs 14 upon the inner surface of the main casing 8 may also be provided. If desired, as also shown in Figure 1, the casing may be provided with external constraining bands or tension cables 16.

The structure thus provided will have within it one or more inflatable inner cells or tubes 18 which, when inflated, exert pressure in all directions and dimensions and thus not only exert a lengthwise pull on the cables 6 to extend the foil to its full length, but also exert tension upon the transverse cables or cords 12, the ribs 14 and bands 16 to extend the casing 1 to its full aerodynamic shape.

As shown in Figure 1A, the clincher ring or band 3 may be provided with bolt openings 20 by which it may be bolted to the side of the fuselage 22 and the valve tubes or stems 24 may extend from the inner tube or tubes 18 through the fuselage wall so that the valve or valves 26 for controlling the inflation of the inner tube or tubes 18 may be accessible from within the fuselage.

Figure 4:
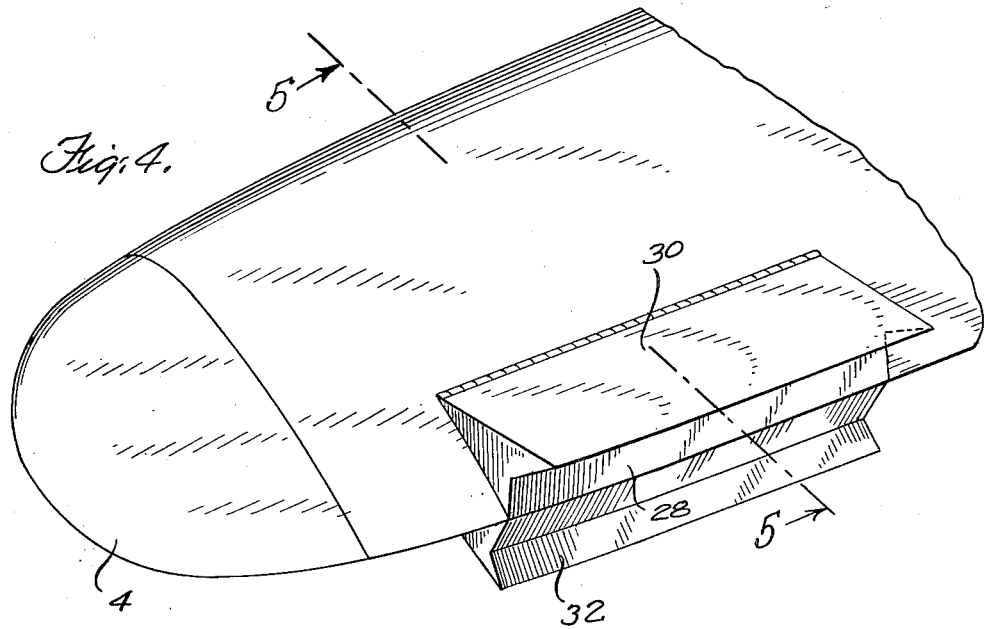
Figure 4 is a perspective view of a pneumatic aileron embodying the present invention.
Figure 5:
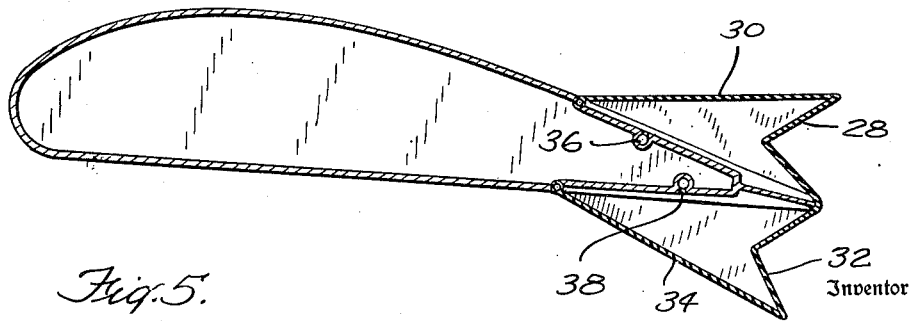
Figure 5 is a section on the line 5—5 of Figure 4.

In Figures 4 and 5 the invention is shown as applied to the construction and operation of the ailerons. The aileron construction shown in Figures 4 and 5 differs from the normal aileron in that the wing tipping effect is not produced by the swinging movement of a single body into positions above and below the rear edge of the wing but is produced by alternately moving a section of the upper wing surface upward away from the main surface and a section of the lower wing surface downward away from the main surface. As the upper section is moved upward away from the main wing surface the movable section of the lower surface is brought into register with said surface and vice versa.

This action is brought about, as shown in Figures 4 and 5, by means of a bellows 28 serving to move the upper movable wing section 30 upward away from the main body of the wing and back into register with the main body again and a bellows 32 serving to move the lower movable wing section 34 downward away from the main wing surface and again to bring it into register therewith. Suitable air passages 36 and 38, through which air may alternately be forced to expand the respective bellows and from which it may alternately be withdrawn to contract the respective bellows, serve to produce the desired wing tilting actions of the ailerons.

In Figures 6, 7 and 8 is shown a modification of the airfoil construction shown in Figure 1. In this modification the airfoil is provided with an extensible tip by means of which it may, when desired, be caused to present a greater wing spread, as, for example, when travelling at high altitudes where a greater supporting wing surface may be desirable. In the form of the invention shown in Figures 6 to 8, inclusive, the main casing 8 of each wing is provided with an accordion-like extension 40 which may be held in the condition shown in Figures 6 and 8 by means of a coil spring 42 embedded in or otherwise maintained in operative relation to the extension 40. Within the accordion-like extension 40 is an inner cell or tube 44 arranged to be supplied with inflating air or other gas through a valve stem or tube 46, extending into the fuselage 22, through which air may be introduced into the inner tube 44 under pressure to cause the extension of the accordion-like tip 40, as shown in Figure 7, to extend the overall spread of the wings of the aircraft. Release of the air from the tube 44 permits the wing tips 40 to contract again under the action of the springs 42 to their condition shown in Figures 6 and 8.

In Figure 9 the invention is shown as applied to an airfoil in such manner that the aerodynamic shape of the airfoil may be changed in flight to meet different conditions. As illustrated, the casing 8 of the airplane wing shown in Figure 9 is provided with upper and lower inflatable blisters 48 and 50 so designed that, as shown in Figure 9, when inflated they increase the bluntness of the leading edge of the wing while maintaining a desirable overall aerodynamic shape. Thus, for example, the blisters 48 and 50 may be inflated before take-off to provide a large attack surface on the leading edge and then when the desired altitude has been attained the blisters may be deflated sufficiently to provide a sharper leading edge for continuous flight.

It will be apparent that the blisters 48 and 50 may themselves constitute inflatable parts of the structure into which the inflating gas such as air may be directly introduced or that they may be provided with inner tubes such as that shown at 52 in the upper blister 48, which, when inflated, presses the blister into the desired shape. The blister wall itself will obviously be provided with reinforcements to maintain the aerodynamic shape, such, for example, as those illustrated in Figures 1 to 3 inclusive.

In Figure 10 the invention is shown as embodied in a propeller. In this embodiment of the invention the propeller blades are shown as comprising casings 54 of the general construction of the casings 8 shown in Figures 1 to 3, that is reinforced and provided with flexible struts, not shown in detail. The casings 54 are so designed that when the inner tubes 56, contained within the casings 54, are inflated the casings 54 will each assume the desired propeller blade shape.

To provide for automatic control of the inflated condition of the pneumatic blades 54 the hub 58 of the propeller may be made hollow, as shown, to receive a gas pressure tank 60 connected, as shown, through stems 62 with the inner tubes 56 of the blades 54 and the tank 60 itself may be connected to any suitable automatic pressure regulator, not shown, including a reserve supply of compressed gas, for maintaining a constant pressure in the tank 60 and therefore in the connected inner tubes 56, regardless of the altitude at which the plane is flying.

An advantage of the illustrated propeller construction over the conventional propeller, which is usually made of easily deformed material, is that contact of the propeller blades with some object that might deform an ordinary propeller blade will only effect a temporary change in shape, the propeller immediately resuming its desired aerodynamic shape as soon as it again comes out of contact with the deforming obstacle.

In Figure 11 is shown a modification of the airfoil shown in Figures 1 to 3 to adapt it for the use of two different gases and also for the support of a fuel tank within the foil. In this embodiment of the invention the fuel tank 64 is shown as supported within the airfoil between upper and lower inflatable inner tubes 66 and 68 which protect the tank from injury. For reducing the weight and possibly adding some buoyancy to the airfoil shown in Figure 11, the upper inner tube or gas cell 66 may be inflated with a lighter than air gas, such as helium, and the lower cell 68 may be inflated with air. One advantage of this is that, since the air is an inexpensive and universally replaceable gas, the required pressure within the airfoil necessary for maintaining its desired aerodynamic shape may be maintained at different altitudes by varying the pressure within the inner tube or gas cell 68 only, thus avoiding waste of the helium or other less obtainable gas in the cell 66.

In Figures 12 and 13 are shown modifications of the airfoil construction intended to provide conduits for heated or other surface conditioning gases.

In the form of the invention shown in Figure 12 the outer casing comprises a flexible strut reinforced main part 70 having its outer face provided with grooves or channels 72 which, when covered by the outer sheathing 74, form conduits for an airfoil surface conditioning fluid, such, for example, as heated air or exhaust gases from the power plant.

In the form of the invention shown in Figure 13 the grooves or channels 72 serve to receive a continuous conduit pipe 76 through which the surface conditioning heating fluid circulates.

In the modification shown in Figure 14 the invention is shown as embodied in a wing type airfoil in which the airfoil is also provided with standard or typical wing struts or ribs In this modification the central struts or ribs 78 have located between themselves and a flexible strut reinforced outer casing 80, covered with a sheathing 82, inner tubes, 84 and 86 which may be inflated to bring the flexible strut reinforced outer casing into its desired aerodynamic shape. The main body 80 of the outer casing is provided with staggered ribs 87 on which the sheathing 82 rests thus forming channels 88 for the surface conditioning fluid which may be introduced into these channels through passages 90 connected to a manifold conduit 92 located in the hollow forward ends of the ribs or struts 78.

In the form of the invention shown in Figure 15 the flexible outer casing is formed, as shown, by transversely linking together a series of longitudinally extending hollow plates 94 which have in themselves sufficient conformation to the desired ultimate aerodynamic contour of the airfoil so that, when the inflatable cell 96 is inflated, these linked plates will quickly assume the said desired aerodynamic contour. It will be seen that the plates 94 themselves constitute reinforcing struts by reason of the material of which they are composed and that the linking pivots 98 may also be made continuous and thus form longitudinal struts.

Figure 16:
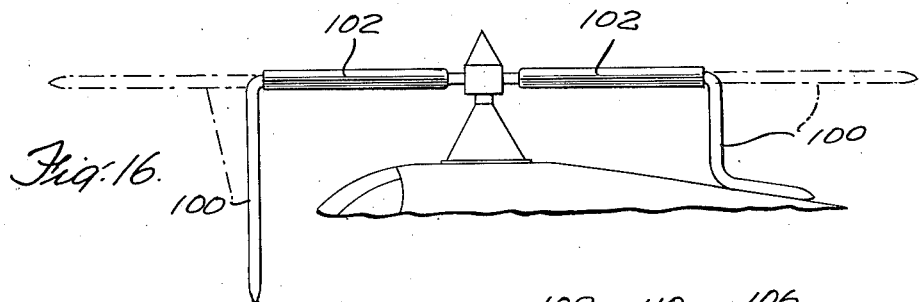
Figure 16 illustrates the invention applied to a limp type main propeller of a helicopter or similar aircraft.
Figure 17:
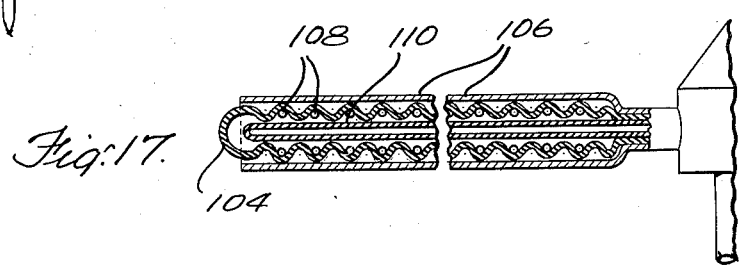
Figure 17 illustrates the invention applied to a propeller having extensible blades, Figure 17 showing the propeller in its contracted condition.
Figure 18:
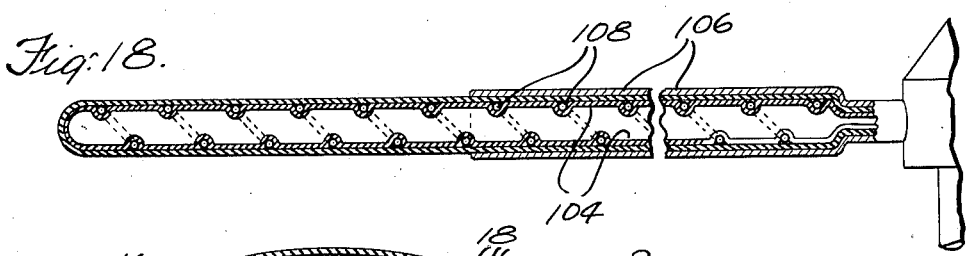
Figure 18 shows a blade of the propeller of Figure 17 in its extended condition.

In Figures 16, 17 and 18 the invention is shown as applied to the limp type of main rotors of helicopters and the like. In this type of rotor, which has a flexible outer end that collapses, when the rotor is not in motion, to avoid its taking up too much space, the invention finds an important field of utility. As shown in Figure 16, the rotor blades of the limp type rotor comprise flexible strut reinforced casings 100, either directly inflatable or having therein suitable inner tubes which may serve to effect the inflation or distention of the casing 100 to its desired aerodynamic shape. As further shown in this figure, a casing 100 is normally of full operative length but is so flexible that, when deflated, the part outside the sheath 102 drops down into the position shown. When inflated the rotor blade casing 100 will assume a substantially horizontal position and also the desired aerodynamic shape of the typical helicopter main rotor blade.

In the form of the invention shown in Figure 17 the rotor blade 104, instead of being of normal maximum or operative length, both when inflated and when deflated, is so constructed that, when deflated, it contracts into the sheathing 106, as shown in Figure 17, and when inflated is extended to its full operative length, as shown in Figure 18, and also into its proper aerodynamic shape. The contraction may be effected by a coil spring 108 embedded in the casing 104 and the expansion may be effected by inflating an inner tube 110.

Figure 19:
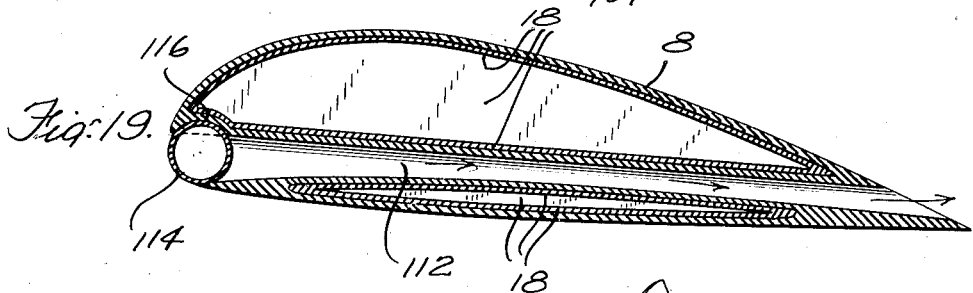
Figure 19 shows the invention applied to a bolster for varying the aerodynamic characteristics of an airfoil having a slipstream tunnel therethrough.

In Figure 19 is shown still another way of effecting a change in the aerodynamic characteristics of an airfoil during flight. In this modification of the invention the airfoil is shown as provided with a central air passage or tunnel 112, normally open at its front end during flight, the structures on the upper and lower sides of this central air passage 112 being each substantially that shown in Figure 1, that is, each comprising an outer casing 8 and an inner tube or air pressure cell 18. When desired, this tunnel 112 may be closed at its front end by means of an inflatable bolster or bolsters 114 located at said front end and arranged to be controlled in any suitable manner from the fuselage. When the bolster 114 is deflated it may be caused, by the exhaustion of the air therefrom, to withdraw into a recess 116 either in the upper part or in the lower part of the airfoil, thus providing for free movement of a part of the slip-stream through the tunnel 112.

Figure 20:
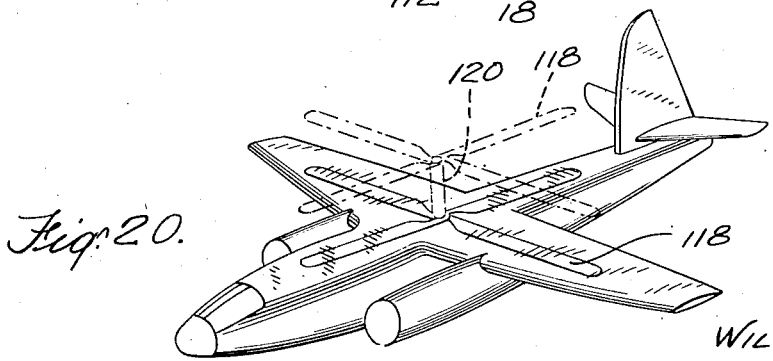
Figure 20 shows the invention applied to a collapsible helicopter type rotor designed for use in slowing up the descent of an airplane when power failure occurs.

In Figure 20 is shown the application of the invention to safety devices for preventing airplane crashes due to power failure or similar causes. As shown in Figure 20 there is located in suitable recesses in the wings and fuselage of an airplane, in such manner as not to be affected by the slip-stream normally passing thereover, a large rotor 118 of the helicopter or autogyro type, for example, one of the type shown in Figures 17 and 18 or one of the type shown in Figure 16. This rotor will have a central shaft 120 suitably journaled and vertically adjustable in the upper part of the fuselage and connections to a suitable source of compressed gas within the fuselage so that, in the event of failure of the main power plant of the airplane, the rotor 118 may have its blades inflated to their operative condition and the shaft moved upwardly into a position to insure the known retarding action of the rotor as the plane descends.

Although the invention has so far been described as embodied in elements of aircraft having their own power plants, it will be understood that the invention is equally applicable to the airfoils of gliders and also to other aircraft in which there are elements which are so designed that when moved through the air they produce a useful dynamic reaction For example, as hereinabove suggested, cargo landing devices may be made in the form of collapsible gliders embodying the structural principles of the present invention which may be carried in a power-operated aircraft to a point near the point of delivery of the cargo and then inflated and released to glide the cargo to its destination. It will also be understood that the same principle may be applied to airfoils for bombs and other projectiles which it is desired to discharge from the main plane at a point remote from the target and out of the range of the anti-aircraft defenses of the target.

It will further be understood that the invention permits the carrying of smaller self-propelled aircraft on large mother aircraft, the airfoils of the smaller craft being deflated for storage purposes in the larger craft and only inflated at the time of discharge to operate under their own power. These smaller self-propelled aircraft may comprise self-propelled projectiles such, for example, as a projectile having wings and suitable propelling means in the form of a jet motor, rocket propulsion or other self contained power plant, such as those used in torpedoes.

The invention is not only applicable to airfoils of the types hereinabove described, but it also has considerable utility, particularly in respect to shock absorption, in the design and construction of structural elements of aircraft which do not come within the definition of airfoils since they produce no useful aerodynamic action when moved through the air.

What I claim as new is:

1. An airfoil comprising, in combination, a collapsible flexible casing designed to conform, when tensioned, to the desired aerodynamic contour of the airfoil, flexible struts embedded within the walls of said casing and so arranged both longitudinally and transversely of said casing that, when tensioned, they act to reinforce said casing to withstand, in use, those aerodynamic stresses which tend to deform it from said desired aerodynamic contour, and means for maintaining casing tensioning pneumatic pressure therein, said airfoil having an extensible tip, normally retracted, and pneumatic means for extending said tip.

2. An airfoil comprising, in combination, a collapsible flexible casing designed to conform, when tensioned, to the desired aerodynamic contour of the airfoil, flexible struts embedded within the walls of said casing and so arranged both longitudinally and transversely of said casing that, when tensioned, they act to reinforce said casing to withstand, in use, those aerodynamic stresses which tend to deform it from said desired aerodynamic contour, and means for maintaining casing tensioning pneumatic pressure therein, said airfoil having an extensible tip comprising a flexible casing and a spring connected therewith for maintaining said tip normally in its retracted position and pneumatic means for effecting extension of said tip against the tendency of said spring to retract it.

3. An airfoil comprising, in combination, a collapsible flexible casing designed to conform, when tensioned, to the desired aerodynamic contour of the airfoil, flexible struts embedded within the walls of said casing and so arranged both longitudinally and transversely of said casing that, when tensioned, they act to reinforce said casing to withstand, in use, those aerodynamic stresses which tend to deform it from said desired aerodynamic contour, and means for maintaining casing tensioning pneumatic pressure therein, said airfoil constituting one of a plurality of like blades of the main rotor of a helicopter and having a hub supported sheath and spring means normally retracting said airfoil into said sheath and means for supplying pneumatic pressure to said airfoil both to effect its extension to its operative length and its distention to its operative shape.

WILFRED THOMAS.

REFERENCES CITED

The following references are of record in the file of this patent:

UNITED STATES PATENTS

| Number | Name | Date |
| --- | --- | --- |
| 1,360,596 | St. John | Nov. 30, 1920 |
| 1,506,146 | Ziemss | Aug. 26, 1924 |
| 1,705,126 | Lee | Mar. 12, 1929 |
| 1,904,923 | MacCaskie | Apr. 18, 1933 |
| 2,090,038 | Goddard | Aug. 17, 1937 |
| 2,120,250 | Houston | June 14, 1938 |
| 2,226,978 | Pescara | Dec. 31, 1940 |
| 2,227,204 | Sepko | Dec. 31, 1940 |
| 2,306,759 | Sears | Dec. 29, 1942 |
| 2,375,858 | Makaroff | May 15, 1945 |
| 2,378,528 | Arsandaux | June 19, 1945 |
| 2,392,443 | Yaungman | Jan. 8, 1946 |
| 2,412,908 | Platt et al. | Dec. 17, 1946 |

FOREIGN PATENTS

| Number | Country | Date |
| --- | --- | --- |
| 8,290 | Great Britain | of 1910 |
| 522,042 | Great Britain | June 6, 1940 |